United States Patent
Burbridge et al.

(10) Patent No.: US 10,523,571 B2
(45) Date of Patent: Dec. 31, 2019

(54) PROCESSING DATA ITEMS IN A COMMUNICATIONS NETWORK

(71) Applicant: BRITISH TELECOMMUNICATIONS PUBLIC LIMITED COMPANY, London (GB)

(72) Inventors: Trevor Burbridge, London (GB); Alan Smith, London (GB); Philip Laurence Eardley, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 15/562,651

(22) PCT Filed: Mar. 11, 2016

(86) PCT No.: PCT/EP2016/055261
§ 371 (c)(1),
(2) Date: Sep. 28, 2017

(87) PCT Pub. No.: WO2016/156014
PCT Pub. Date: Oct. 6, 2016

(65) Prior Publication Data
US 2018/0091431 A1    Mar. 29, 2018

(30) Foreign Application Priority Data
Mar. 30, 2015   (EP) .................................... 15275093

(51) Int. Cl.
*H04L 12/851* (2013.01)
*H04L 12/26* (2006.01)
(Continued)

(52) U.S. Cl.
CPC ...... *H04L 47/2441* (2013.01); *H04L 43/0864* (2013.01); *H04L 43/10* (2013.01);
(Continued)

(58) Field of Classification Search
CPC ..... H04L 47/2441; H04L 69/22; H04L 45/38; H04L 47/283; H04L 43/0864;
(Continued)

(56) References Cited

U.S. PATENT DOCUMENTS 7,933,268 B1    4/2011   Melman et al.
8,135,657 B2 *  3/2012   Kapoor .................. G06F 9/505
                                                706/45
(Continued)

FOREIGN PATENT DOCUMENTS

GB      2 426 886       12/2006
WO   WO 2013/100752     7/2013

OTHER PUBLICATIONS

International Search Report and Written Opinion of the ISA for PCT/EP2016/055261 dated Apr. 25, 2016, 11 pages.
Search Report for EP15275093.1 dated Sep. 10, 2015, 6 pages.

*Primary Examiner* — Brian T O Connor
(74) *Attorney, Agent, or Firm* — Nixon & Vanderhye P.C.

(57) ABSTRACT

Methods and apparatus are disclosed for processing data items received at a network element in a communications network. In particular, methods and apparatus are disclosed for processing data items such as packets received at a network element such as a router or other such packet-forwarding network element (20) from a source (1, 1') and which are intended to be forwarded towards an intended receiver (2, 2') in a communications network such as a network operating according to the Internet Protocol.

20 Claims, 7 Drawing Sheets

(51) Int. Cl.
*H04L 12/721* (2013.01)
*H04L 12/841* (2013.01)
*H04L 29/06* (2006.01)
*H04L 12/14* (2006.01)
*H04L 12/707* (2013.01)
*H04L 12/833* (2013.01)

(52) U.S. Cl.
CPC ............ *H04L 45/38* (2013.01); *H04L 47/283* (2013.01); *H04L 69/22* (2013.01); *H04L 12/14* (2013.01); *H04L 43/0829* (2013.01); *H04L 43/0876* (2013.01); *H04L 43/0888* (2013.01); *H04L 43/16* (2013.01); *H04L 45/14* (2013.01); *H04L 45/22* (2013.01); *H04L 45/26* (2013.01); *H04L 45/70* (2013.01); *H04L 47/31* (2013.01)

(58) Field of Classification Search
CPC ......... H04L 43/10; H04L 45/70; H04L 45/26; H04L 45/14; H04L 12/14; H04L 47/31; H04L 45/22; H04L 43/0876; H04L 43/16; H04L 43/0888; H04L 43/0829
See application file for complete search history.

(56) References Cited

U.S. PATENT DOCUMENTS

| | | | |
|---|---|---|---|
| 8,339,963 B2* | 12/2012 | Babiarz | H04L 29/06027 370/236 |
| 8,462,659 B2* | 6/2013 | Hong | H04W 24/00 370/252 |
| 8,605,597 B2* | 12/2013 | Hong | H04W 24/00 370/241 |
| 8,953,443 B2* | 2/2015 | Yang | H04L 47/127 370/230 |
| 9,294,973 B2* | 3/2016 | Liu | H04W 36/0083 |
| 9,525,696 B2* | 12/2016 | Kapoor | H04L 63/1425 |
| 9,559,975 B1* | 1/2017 | Chen | H04L 47/6215 |
| 9,712,415 B2* | 7/2017 | Groenendijk | H04L 41/5035 |
| 10,135,698 B2* | 11/2018 | Groenendijk | H04L 41/5009 |
| 10,250,474 B2* | 4/2019 | Akhter | H04L 43/0858 |
| 2002/0009072 A1 | 1/2002 | Halme | |
| 2008/0229415 A1* | 9/2008 | Kapoor | G06F 21/55 726/22 |
| 2009/0067335 A1* | 3/2009 | Pelletier | H04L 41/5025 370/238 |
| 2011/0116373 A1 | 5/2011 | Lauer | |
| 2012/0300664 A1* | 11/2012 | Hong | H04L 43/0894 370/252 |
| 2013/0088955 A1 | 4/2013 | Van Den Berg et al. | |
| 2014/0321311 A1* | 10/2014 | Groenendijk | H04L 41/5035 370/252 |
| 2014/0328174 A1* | 11/2014 | Babiarz | H04L 29/06027 370/231 |
| 2015/0029861 A1* | 1/2015 | Yazaki | H04L 69/16 370/235.1 |
| 2015/0281028 A1* | 10/2015 | Akhter | H04L 43/106 370/252 |
| 2015/0372931 A1* | 12/2015 | Puleri | H04Q 11/0066 398/47 |
| 2016/0112891 A1* | 4/2016 | Chetlur | H04L 43/0882 370/252 |
| 2016/0134544 A1* | 5/2016 | Roy | H04L 47/14 370/235 |
| 2016/0174110 A1* | 6/2016 | Sharma | H04W 36/0022 370/331 |
| 2017/0346705 A1* | 11/2017 | Szilagyi | H04L 43/08 |

* cited by examiner

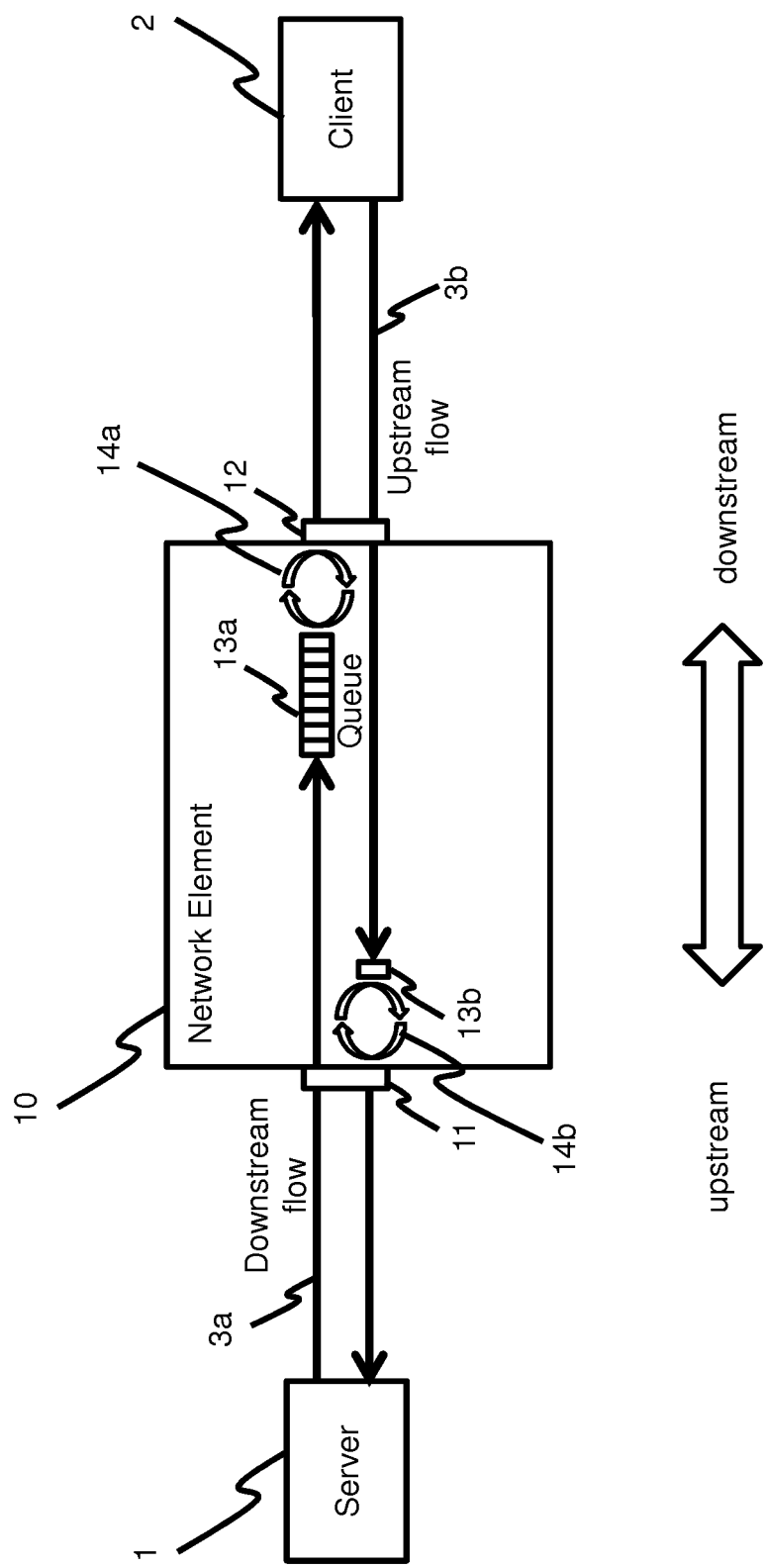
Figure 1 - Packet Forwarding

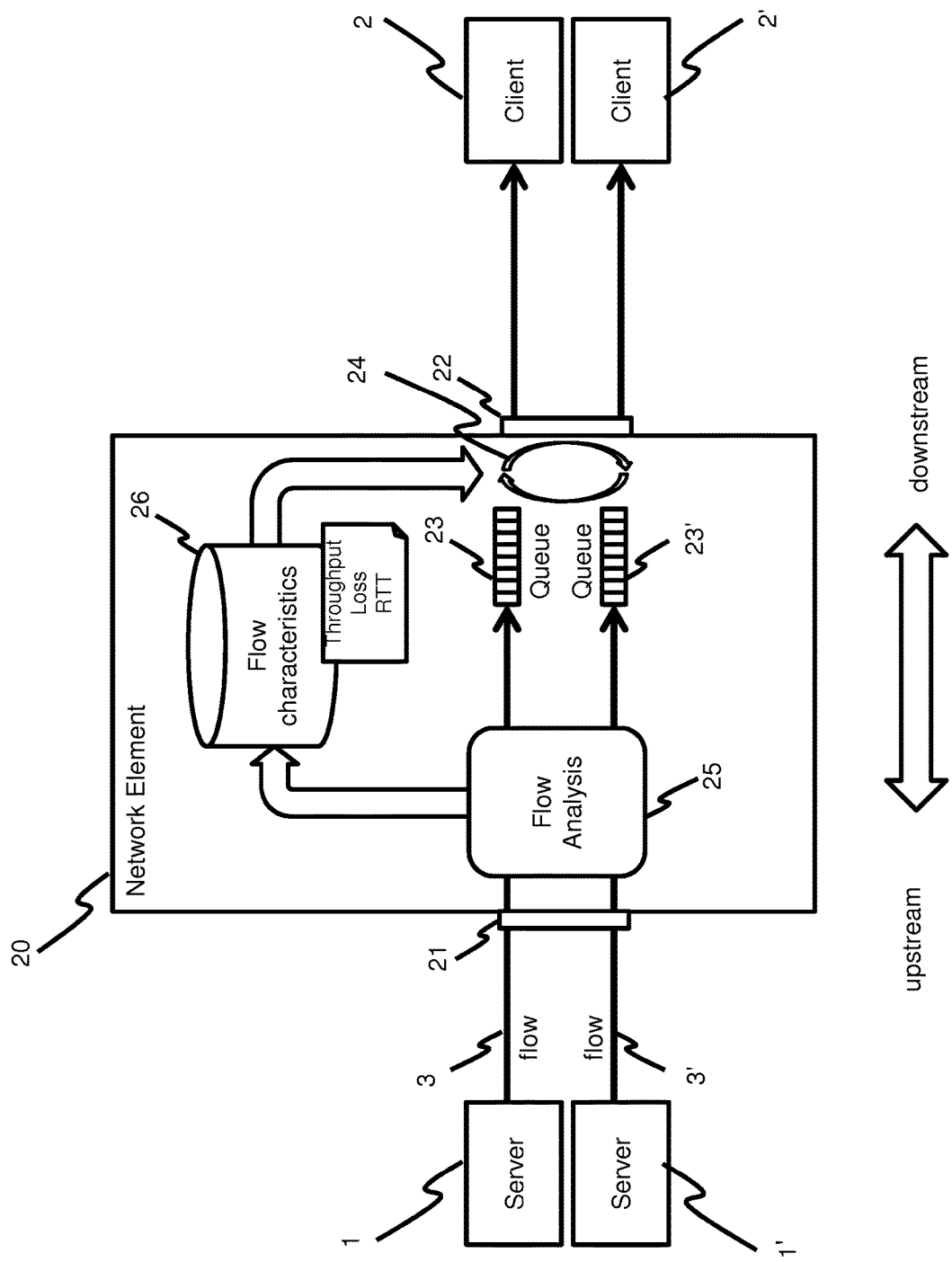
Figure 2 - Flow Priority Forwarding

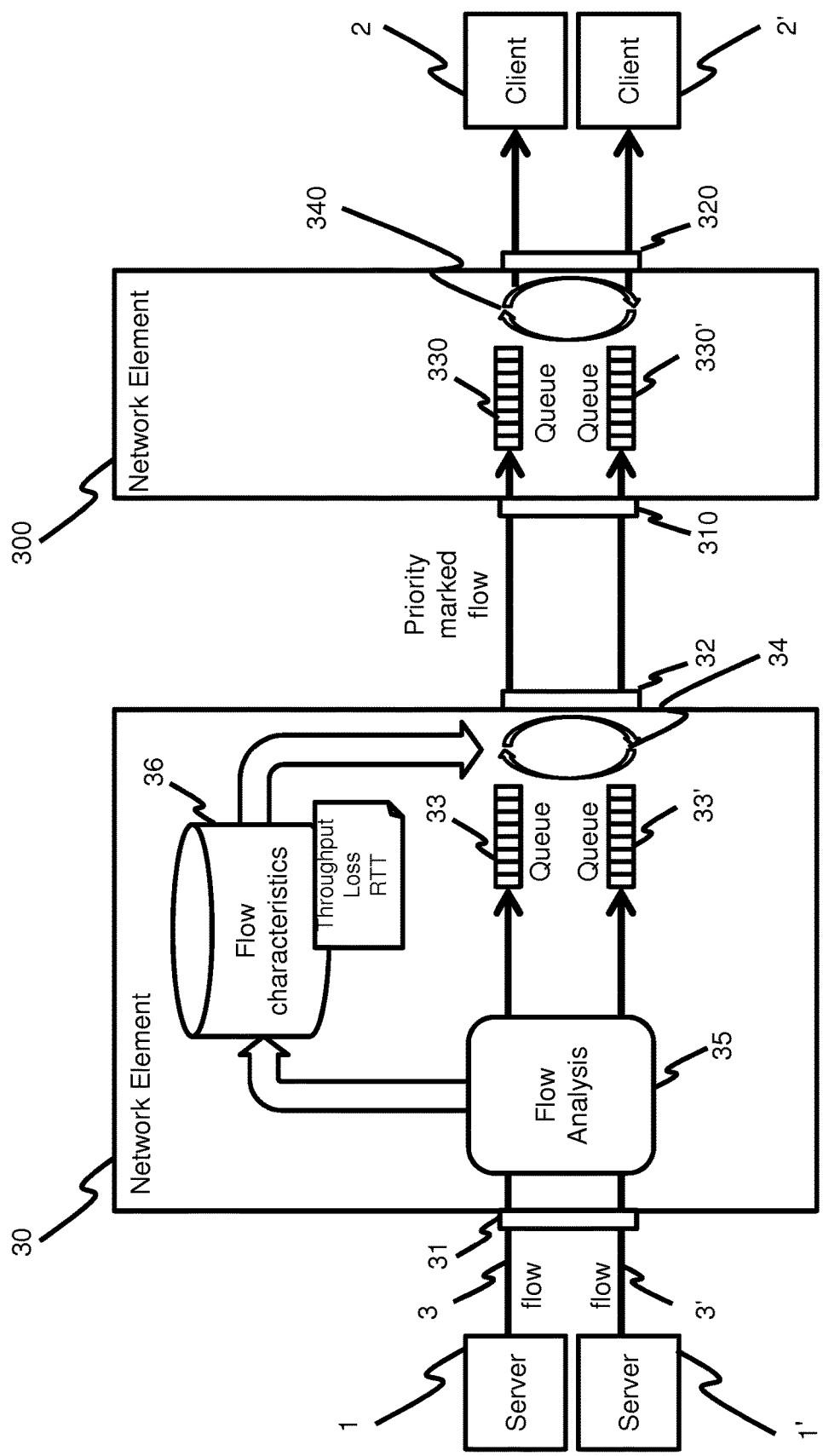
Figure 3 - Network System for Flow Priority Forwarding

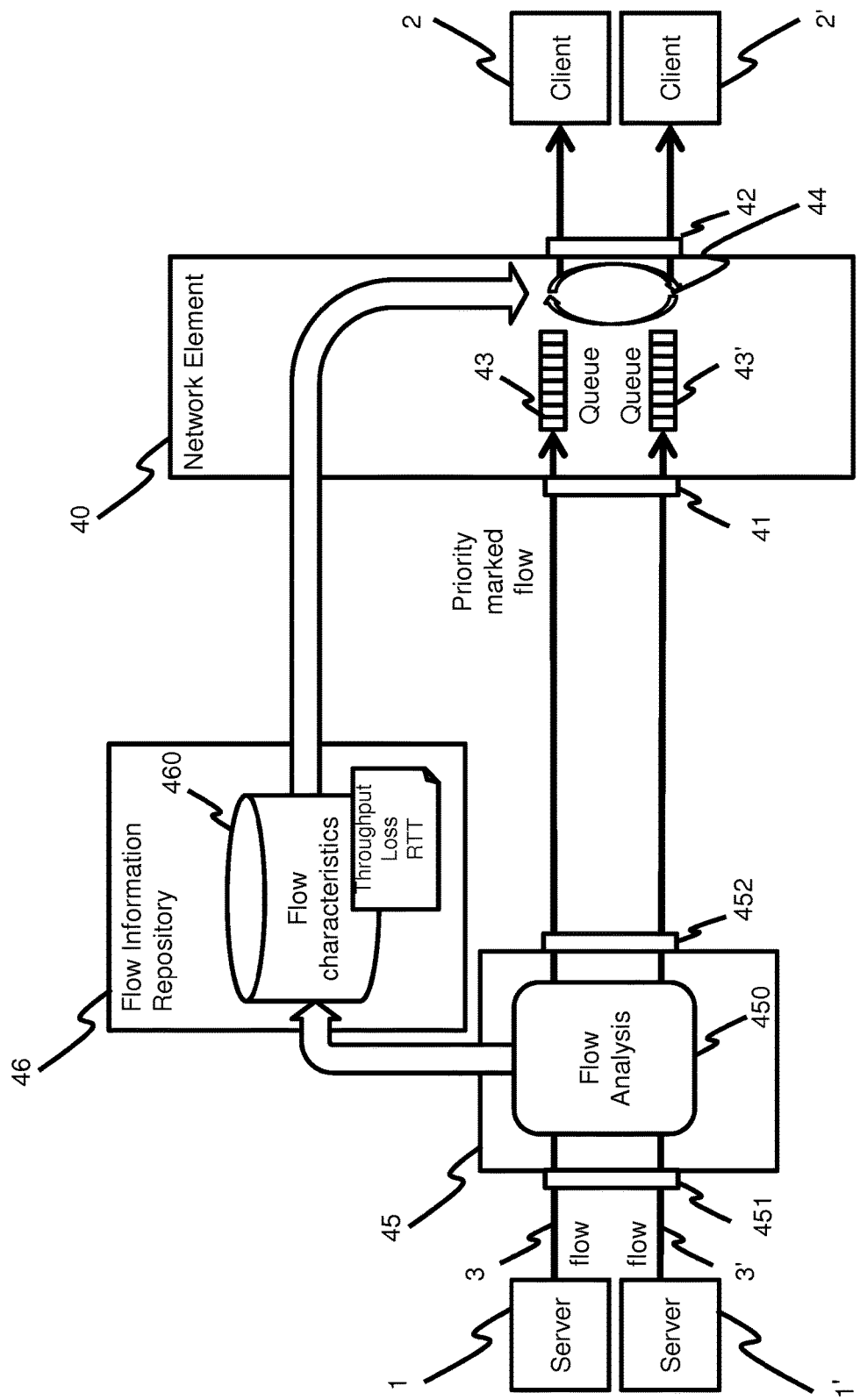
Figure 4 - Non Real-Time Flow Priority Forwarding

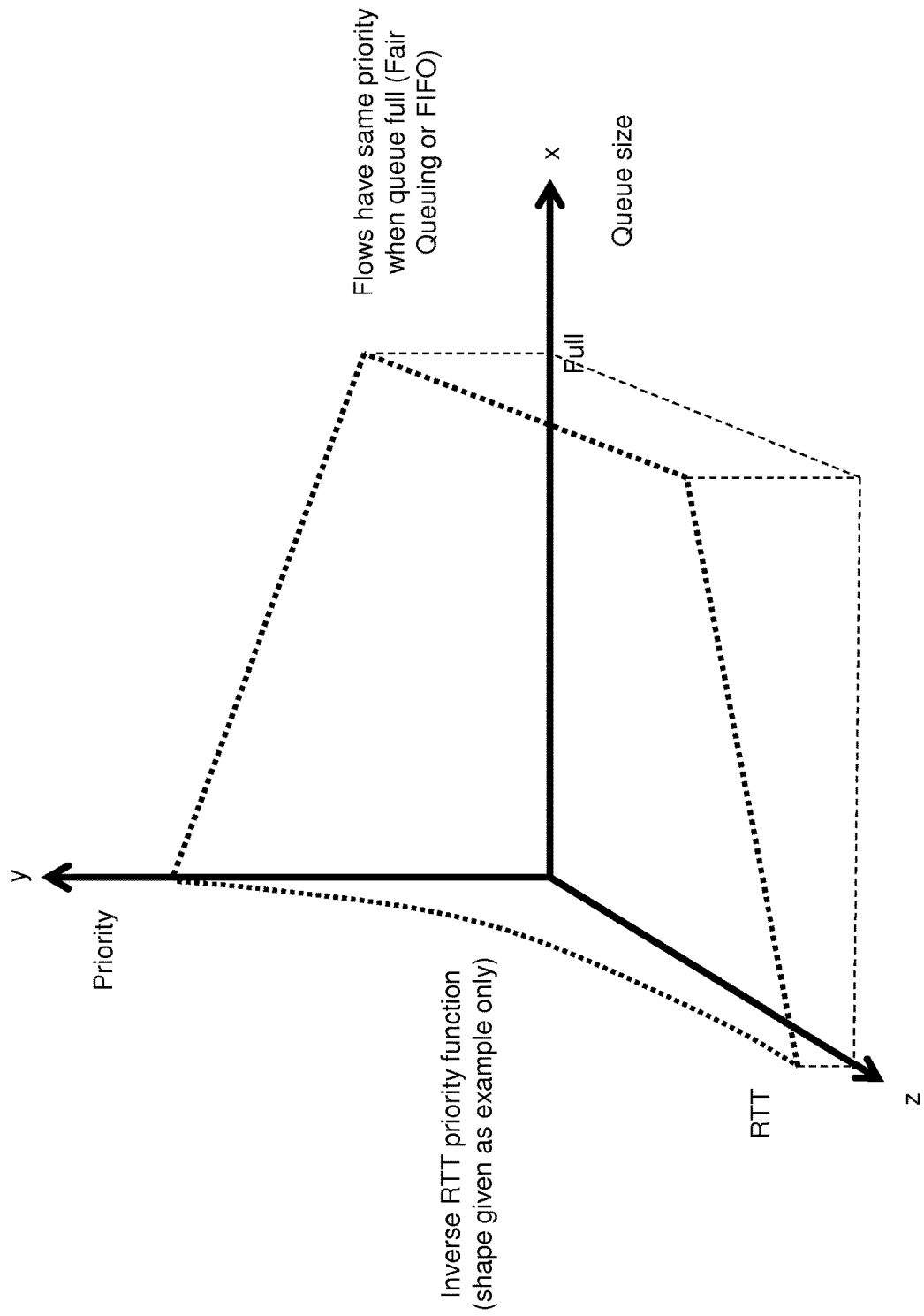
Figure 5 - Possible Priority Function

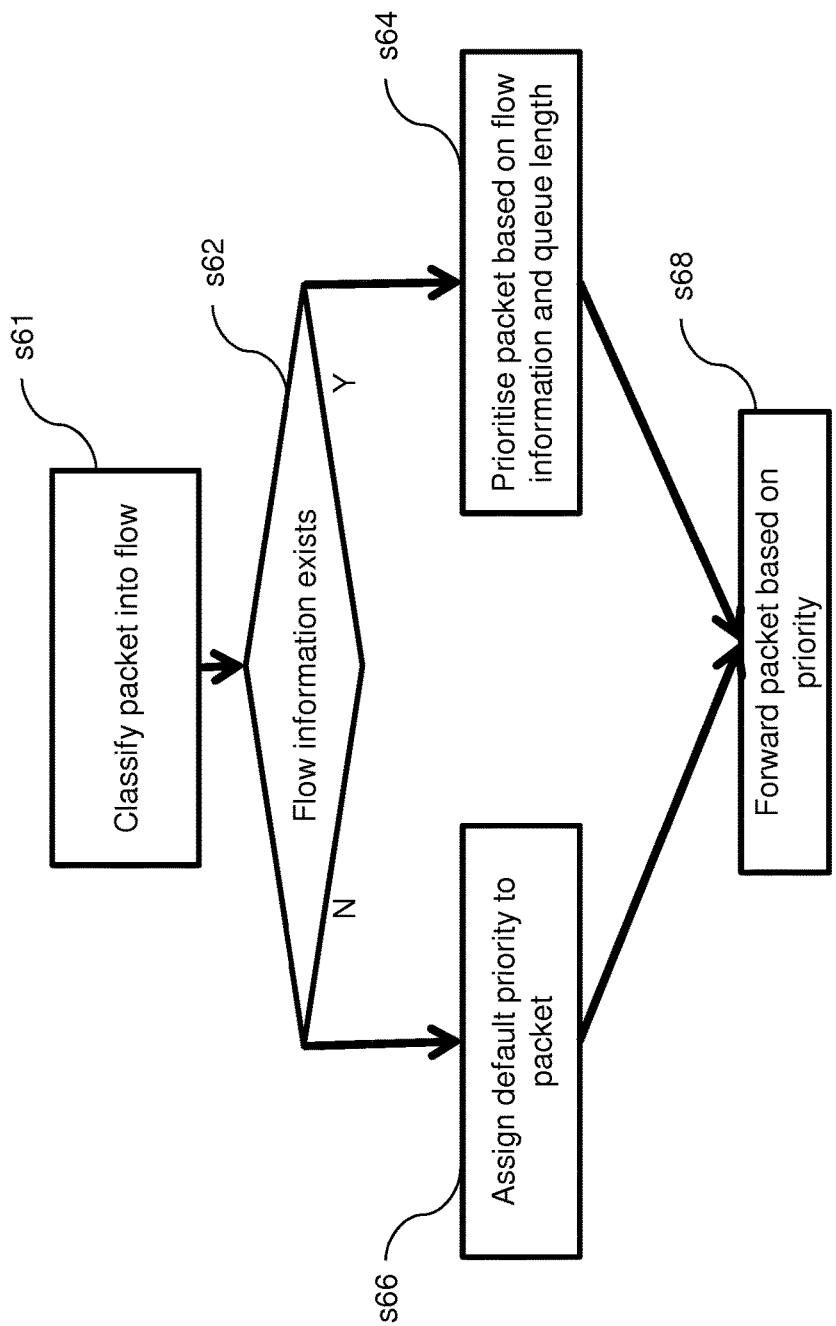
Figure 6 - Independent Forwarding Process

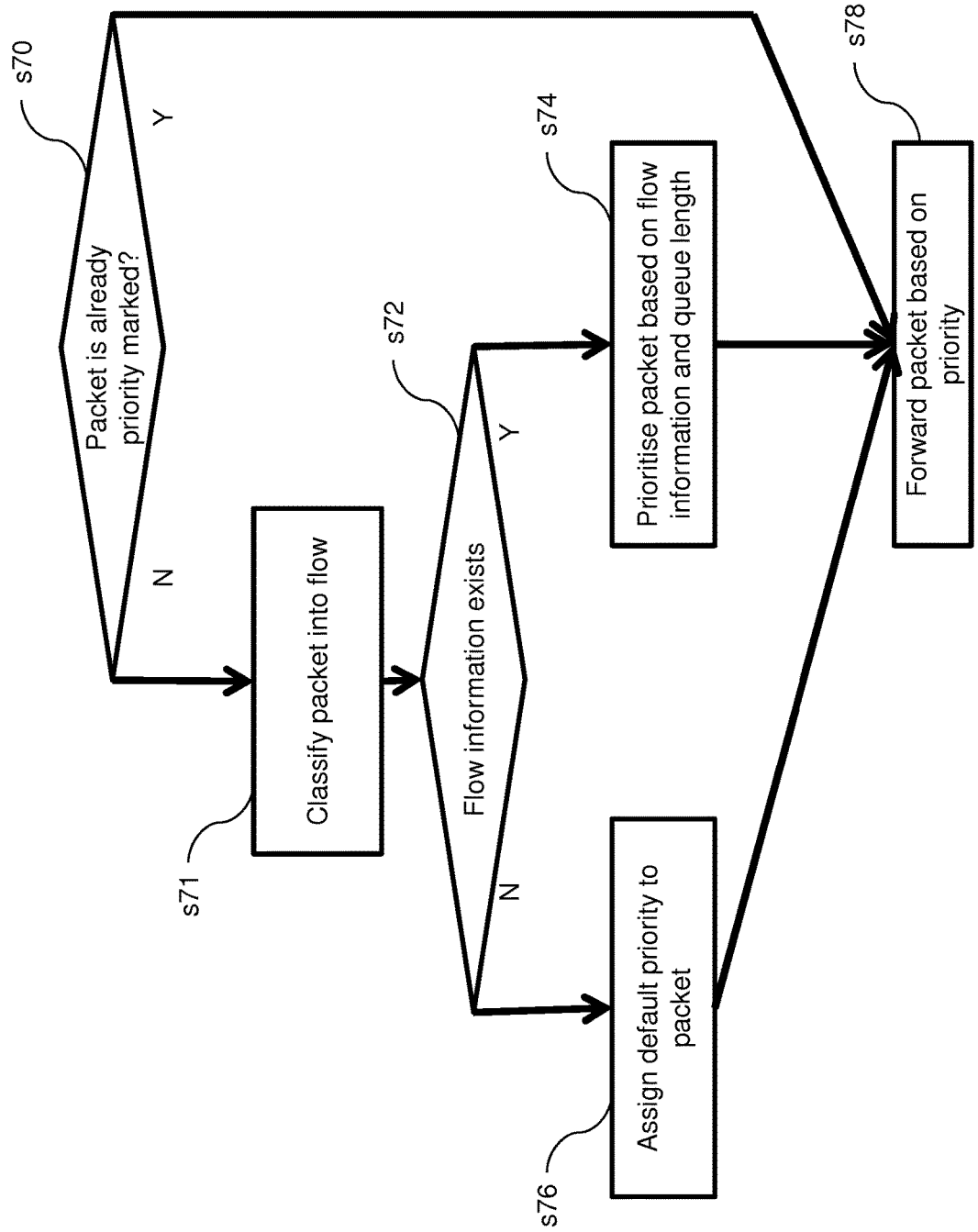
Figure 7 - Network Forwarding Process

PROCESSING DATA ITEMS IN A COMMUNICATIONS NETWORK

This application is the U.S. national phase of International Application No. PCT/EP2016/055261 filed Mar. 11, 2016 which designated the U.S. and claims priority to EP Patent Application No. 15275093.1 filed Mar. 30, 2015, the entire contents of each of which are hereby incorporated by reference.

TECHNICAL FIELD

The present invention relates to processing data items received at a network element in a communications network. In particular, it relates to methods of processing data items (such as packets) received at a network element (such as a router or other such packet-forwarding network element) and intended to be forwarded towards an intended receiver in a communications network such as a network operating according to the Internet Protocol (IP).

BACKGROUND TO THE INVENTION AND PRIOR ART

In packet-based networks (such as those operating according to the Internet Protocol, IP), network elements such as routers receive and forward packets. They have interfaces (or possibly a single interface) via which packets are received and forwarded. Since the output capacity on an interface is limited and incoming traffic may be irregular (referred to as "bursty"), network elements generally store packets temporarily in a buffer prior to forwarding them. These packets are referred to as a queue. The sizes of such buffers may be limited by cost considerations, but their sizes (as well as their fullness) may also serve as parameters in relation to a signalling mechanism to the traffic senders. By dropping (or alternatively, marking) packets, a sender using Transmission Control Protocol (TCP) is instructed to reduce their sending rate. This allows all senders to be allocated a share of traffic through the network, rather than flooding the network and making it unusable to everyone.

There are various techniques governing how packets are removed from the queue (or marked) either for forwarding over an interface or to signal congestion.

Normally a tail-drop discipline is used meaning that packets arriving after the queue is full are dropped until the queue diminishes and is able to accept further packets. This approach leads to several problems, however. The tail-drop approach often means that bursty traffic is penalised and a full queue can lead to very high round-trip delays that are detrimental to interactive applications. Tail drop with long delays can also cause the TCP protocol to enter "Slow-Start" at times when this may not be necessary.

Active Queue Management (henceforth AQM) is a term applied to a range of techniques in packet networking which seek to improve the behaviour of network queues by intelligently selecting which packets to drop or mark. Various AQM techniques will be discussed later.

In the absence of AQM a queue will fill until it is full. This can cause high round-trip communication delays and bursty loss that together or individually can cause problems for many applications. It can also cause synchronisation problems in the interaction between multiple application flows. In AQM packets are selectively marked or dropped before the queue is full. This can be used to signal congestion to applications before loss occurs and to try to maintain a low latency across multiple application flows and users.

Another technique referred to as "Traffic Prioritisation" works in a complementary way to AQM by determining which packet to route first. Higher priority traffic will obtain both higher bandwidth and lower latency. This is achieved either by assigning the packets to classes of service in advance or by classifying the traffic at the router itself using techniques such as Deep Packet Inspection (DPI). Typically packets in a higher priority class are dealt with in a strict or weighted order while reserving some minimum capacity for lower classes of traffic.

Referring again to AQM, various AQM techniques have been developed to address the problem of selecting which packets to drop or mark. These include:

Random Early Detection (RED): This works by increasing the probability of dropping or marking as the queue develops. In this way applications receive a more graceful signal to back-off, thereby avoiding or reducing bursty loss and flow synchronisation problems. Several variants (including Weighted RED, Adaptive RED) exist in order to prioritise certain traffic and automatically tune the behaviour.

Controlled Delay (CoDel): This works by constraining the minimum delay experienced by packets within a flow. While bursty traffic is allowed to fill the queue and experience higher delays, the technique generally prevents longer-term standing queues developing by selectively dropping or marking packets for such flows.

Proportional Integral Enhanced (PIE): This also aims to manage the standing latency of the queue. It uses linear control theory to estimate the delay that a packet will experience in the queue and calculates an 'error' as the difference between this value and a target threshold. It also looks at a historical window and drops or marks packets preferentially that have both a high estimated latency error and which are from a flow whose latency has been high for some time.

Differentiated Services (DiffServ): This is a technique which uses pre-determined classes of service to determine the hop-based routing behaviour. Packets can have different priority levels, with each priority level having a forwarding policy. Typically a forwarding weight (i.e. a number of packets to transmit compared to other priority levels) and upper bounds on the bandwidth are applied, in order to leave some network capacity for lower classes of service. No classification or policing occurs on the routing devices, so they can be kept simple.

Deep Packet Inspection (DPI): This is a form of packet monitoring in which the data or "payload" part (and possibly also the header part) of a packet is inspected as it passes an inspection device. It can be used to perform classification—in order to assign a Class-of-Service for a subsequent DiffSery enabled router, or to prioritise or shape traffic on the DPI device. The classification is performed by matching the traffic against signatures. "Deep" inspection means that the device is capable of using signatures that are based on transport headers or application payload information (e.g. HTTP header) rather than just IP source/destination address/port.

StreamBoost: This is a proprietary technology developed for integration into Home Gateways in order to improve the performance of particular applications such as gaming. It has similarities to DPI. It allows a home gateway to classify the type of application associated with a flow and apply priorities based upon that classification. The priorities are based simply on the types of application, and a (static) priority order is selected by the user.

Fair Queuing (FQ): This is a technique in which multiple flows are allocated an equal amount of bandwidth of a bottleneck under congestion.

Other known techniques (which are not themselves AQM techniques) include the following:

First In First Out (FIFO): This is a forwarding algorithm according to which packets are forwarded in the order they are received—i.e. there is no priority applied to the forwarding of packets, unlike with DPI, StreamBoost or FQ.

Application-Layer Traffic Optimization (ALTO): This is a protocol developed within the IETF which has the concept of producing maps of network route costs. These costs can be based on different metrics such as capacity, loss or delay. An application would generally select a network route, or more likely an origin server for the content, based upon the network costs.

Referring to prior patent documents, United States patent application US 2011/116373 relates to a traffic scheduling system for wireless communications. The system first identifies bandwidth-intensive traffic, effecting this at the stream level by measuring the byte-volume of streams over a predetermined period of time and using this data to classify streams into usage categories. Bandwidth-Intensive and near real-time traffic is then said to be controlled by a simple traffic-shaping process "using a traffic management parameter such as via the Round-Trip Time of the next higher priority queue, in the set of queues".

US 2013/0088955 relates to techniques for prioritising the allocation of communication bandwidth in a network. A value is assigned to a prioritisation parameter at an end-point communication device dependent on the priority of an information flow in a network, and the communication bandwidth for the information flow is updated dependent on the value of the prioritisation parameter after a round-trip time for the information flow.

U.S. Pat. No. 7,933,268 B1 (Melman et al) relates to methods of forwarding multicast data packets to selected egress ports in a Medium Access Control (MAC) bridging environment. A multicast data packet is received via an ingress port. A source IP address and a destination multicast IP address are retrieved from the multicast packet. In a forwarding database, different groups of egress ports correspond to different combinations of a source address, a destination multicast address, and a virtual local area network identifier (VLAN-ID). The forwarding database is accessed, based on the retrieved source address, the retrieved destination multicast address, and a VLAN-ID, thereby to determine a corresponding group of egress ports. The multicast packet is then forwarded to the corresponding group of egress ports.

International application WO 2013/100752 ("Mimos Berhad") relates to a method for establishing an end-to-end route for traversing data.

There is growing concern that queue lengths and packet delays are not well managed, and that this can cause detrimental effects on application performance and user experience. Keeping all queues short can provide a partial solution (which can be provided by AQM) but the present inventors are aware that network performance can affect different applications in different ways.

SUMMARY OF THE INVENTION

According to a first aspect of the invention, there is provided a method of processing data items received at a network element in a communications network, respective data items having indications of their source and of an intended destination, the method comprising, in respect of data items received at the network element:

classifying respective data items of those received into subsets in dependence on their respective source and destination indications;

determining respective performance characteristics for the subsets, the performance characteristic for a subset being determined in dependence on one or more time measures indicative of a total time taken for data items to travel from the network element to the intended destination for data items of the subset, from the intended destination for data items of the subset to the source for data items of the subset, and from the source for data items of the subset to the network element; and forwarding respective data items according to a forwarding process dependent on the respective performance characteristics determined for the subsets into which the respective data items have been classified.

The communications network may be an IP network, for example, but certain embodiments may be applicable to other types of communications network.

The data items may be packets or other types of data items. The type or types of data items may depend on the type of communications network.

The network element (and any other element with which it may co-operate) may be a network element such as a router or other such packet-forwarding network element. The type or types of network element may depend on the type or types of data items concerned and/or on the type of communications network.

The subsets into which the respective data items are classified may be individual flows, combinations of individual flows, subsets of individual flows, or other such subsets of the data items received at the network element.

In cases such as those set out in the previous paragraphs, according to preferred embodiments, once the respective data items have been classified into subsets in dependence on their respective source and destination indications, a time measure indicative of the "round-trip time (RTT)" for data units of the subset may be obtained.

Such RTT measures may be made with reference to the (average) time taken for data items of the flow or other such subset in question to travel in what can be regarded as a "downstream" direction (e.g. from a source such as a sender "A" to a destination such as a receiver "C") added to the (average) time taken for the same or different data items forming a flow or other such subset travelling in what can be regarded as an "upstream" direction between the same two end-point entities (i.e. from the receiver "C" to the sender "A"). In some cases, the respective times taken for both end-to-end journeys may be obtained and simply summed to obtain an RTT measure. In other cases, if the time taken for either end-to-end journey is obtained, it may be appropriate to conclude that the time taken for the end-to-end journey in the opposite direction (if this is not known) is likely to be the same or similar, or related to the time taken for the "known" direction, in which case an RTT measure may be inferred.

It will be understood however that RTT measures may also be made by and/or from the point of view of a packet-forwarding network element "B" at an intermediate point on the path of a flow of data items between a sender "A" and a destination "C". From the point of view of such a packet-forwarding network element B, an RTT measure for the flow may be made by measuring the total of three time measures, namely (i) a measure of the time taken for one or more data items of the flow to travel from B to C; (ii) a measure of the time taken for one or more data items associated with the flow (but travelling in the opposite direction) to travel from C to A (possibly, but not necessarily via B); and (iii) a measure of the time taken for one or more subsequent data items of the flow to travel from A to B. Alternatively, an RTT measure for the flow may be made by measuring the time that elapses between the departure from B towards C of a data item of the flow in question, and the arrival of the same or an associated data item of the flow in question at B from A that has traveled from A to B once the same or another associated data item has traveled in the "upstream" direction from C to A.

In each of the above cases (i.e. irrespective of whether the actual round-trip traveled is regarded as starting from and finishing at one end-point (having reached and returned from another end-point), as starting from and finishing at an intermediate point (having reached and left the two endpoints), or otherwise; and irrespective of whether the actual round-trip traveled is regarded as involving two, three, four or possibly more "legs"), RTT measures may thus be made for flows or other such subsets that are indicative of a total time taken for data items to travel from the network element to the intended destination for data items of the subset, from the intended destination for data items of the subset to the source for data items of the subset, and from the source for data items of the subset to the network element.

According to preferred embodiments, respective received data items may have indications of their source and destination port, in which case the classifying of respective received data items into subsets may be done in dependence on the respective source and destination ports as well as (or possibly instead of) the respective source and destination indications. Such indications of source and destination ports may simply be the respective port numbers, for example. Such indications, like the indications of source and of intended destination themselves, may be carried in header or other portions of the data items concerned, for example, or in some scenarios, may be conveyed separately.

According to preferred embodiments, identifications may be made of particular applications in respect of respective data items received, in which case the classifying of respective received data items into subsets may be in dependence additionally on the applications identified in respect thereof. The applications in respect of which the identifications are made may be client applications (e.g. in the context of client/server scenarios). In other scenarios, such as peer-to-peer interactions, the identifications may be indicative of whether the data items concerned form part of a particular "Voice over IP" ("VoIP") session flow, a particular "video stream" flow, or another particular application's flow, for example.

According to preferred embodiments, respective received data items may have additional flow identifiers, in which case the classifying of respective received data items into subsets may be done in dependence additionally on their respective additional flow identifiers.

According to preferred embodiments, the performance characteristic for a subset may be determined in dependence on one or more current and/or most recent time measures in respect of data items of the subset.

According to preferred embodiments, the performance characteristic for a subset may be determined in dependence on a plurality of time measures made at different times in respect of data items of the subset. In such cases, the performance characteristic for a subset may be determined in dependence on a weighted average of the time measures. This may be an exponentially-weighted moving average (EWMA), for example, in order to assign greater weight to more recent time measures. Other types of weighted average may be used, and other types of function may be used in order to determine the performance characteristic from the plurality of time measures.

According to preferred embodiments, the performance characteristic for a subset may be determined in dependence on one or more measures of loss and/or of throughput rate in respect of data items of the subset.

According to preferred embodiments, the forwarding of data items of respective subsets may comprise forwarding data items with a priority dependent on the performance characteristic determined for the respective subset into which the respective data items have been classified.

Alternatively or additionally, the forwarding of data items of respective subsets may comprise forwarding a proportion of data items of a subset, the proportion being dependent on the performance characteristic determined for the respective subset.

Alternatively or additionally, the forwarding of data items of respective subsets may comprise forwarding respective volumes of data items of each respective subset within a particular time period such that each volume makes up a proportion of the total volume of data items of all subsets forwarded within that time period, the proportion for each subset being dependent on the performance characteristic determined for the respective subset.

Alternatively or additionally, the forwarding of data items of respective subsets may comprise assigning marks in respect of a proportion of data items of a subset, the proportion being dependent on the performance characteristic determined for the respective subset.

With reference to at least the four options set out above, according to preferred embodiments, the "forwarding" in different manners for different flows (or other such subsets) may be done in such a way that packets (or other such data items) from flows/subsets having a small or smaller RTT are forwarded with a higher priority (or with a shorter delay) than those from flows/subsets with a large or larger RTT, or such that those from flows/subsets having a small or smaller RTT are allocated a larger proportion of the total bandwidth available for forwarding than those from flows/subsets with a large or larger RTT, or such that fewer of those from flows/subsets having a small or smaller RTT get congestion-marked or dropped than of those from flows/subsets with a large or larger RTT, for example. In some cases, however, it may be deemed appropriate for the manner of forwarding to prioritise or "favour" data items from flows/subsets with a large or larger RTT over those from flows/subsets having a small or smaller RTT.

According to a second aspect of the invention, there is provided apparatus for scheduling the processing of data items received at a network element in a communications network, respective data items having indications of their source and of an intended destination, the apparatus comprising:

one or more processors configured to classify respective data items of those received at the network element into subsets in dependence on their respective source and destination indications, and to determine respective performance characteristics for the subsets, the performance characteristic for a subset being determined in dependence on one or more time measures indicative of a total time taken for data items to travel from the network element to the intended destination for data items of the subset, from the intended destination for data items of the subset to the source for data items of the subset, and from the source for data items of the subset to the network element; and a forwarding scheduler configured to schedule respective data items for forwarding from an interface of the network element according to a forwarding process dependent on the respective performance characteristics determined for the subsets into which the respective data items have been classified.

It will be appreciated that the forwarding scheduler may be implemented as one or more processors configured to schedule respective data items for forwarding as set out above.

According to a third aspect, there is provided a network element for processing data items, the network element comprising:

one or more interfaces configured to receive data items, respective data items having indications of their source and of an intended destination;

scheduling apparatus according to the second aspect configured to schedule the processing of data items received at an interface of the network element; and one or more interfaces configured to forward respective data items in accordance with a schedule determined by the scheduling apparatus.

According to a fourth aspect, there is provided a computer program element comprising computer program code to, when loaded into a computer system and executed thereon, cause the computer to perform the steps of a method according to the first aspect.

The various options and preferred embodiments referred to above in relation to the first aspect are also applicable in relation to the second, third and fourth aspects.

It will thus be understood that preferred embodiments are based on a realisation that the impact of lower bandwidth and higher queuing latency will generally be higher on a flow that is performing well than on one already performing poorly. The nature of Transmission Control Protocol (TCP) is that it will drive throughput towards the available capacity. How quickly it scales up and recovers from loss is regulated by the round-trip latency.

Preferred embodiments are able to use knowledge of round-trip latency (RTT) for individual flows (and possibly other flow performance metrics indicative of characteristics such as packet loss or throughput as well as (or possibly instead of) measures of RTT) in order to improve or optimise the forwarding prioritisation and/or the packet drop/mark algorithm being used by or in respect of a network element such as a router.

Preferred embodiments may be used to allow a network operator to determine how the impact of network queues is balanced across different application flows so as to minimise the overall detrimental impact on user experience. They may be applicable to any packet-forwarding (or other such data item-forwarding) network including Internet Service Provider (ISP) broadband networks, corporate networks and large-scale or global Virtual Private Networks (VPNs) and home networks and other Local Area Networks (LANs).

BRIEF DESCRIPTION OF THE DRAWINGS

A preferred embodiment of the present invention will now be described with reference to the appended drawings, in which:

FIG. 1 shows a packet-forwarding network element forwarding packets between a server and a client;

FIG. 2 illustrates a packet-forwarding technique according to a preferred embodiment of the invention, implemented on a packet-forwarding network element;

FIG. 3 illustrates a packet-forwarding technique according to an alternative embodiment, implemented across two network elements;

FIG. 4 illustrates a packet-forwarding technique according to an embodiment in which historical flow performance is recorded to enable non-real-time processing;

FIG. 5 shows such a possible priority function;

FIG. 6 illustrates a packet-forwarding process according to an embodiment of the invention, performed at a network element; and FIG. 7 illustrates a packet-forwarding process according to an embodiment of the invention, performed at a network element operating in a network where flows may previously have been analysed by an upstream network element.

DESCRIPTION OF PREFERRED
EMBODIMENTS OF THE INVENTION

With reference to the accompanying figures, packet-forwarding methods, apparatus and systems according to embodiments of the invention will be described.

Methods and apparatus according to preferred embodiments bias the loss (i.e. dropping) and/or marking of data items (such as packets) to discriminate in favour of particular flows and/or prioritise the forwarding of data items within certain flows. Although algorithms such and CoDel and PIE (discussed earlier) are able to manage the length of the overall queue, in preferred embodiments, selected flows can be allowed a larger proportion of the available bandwidth by giving them proportionally less congestion signalling and allowing TCP to operate at a higher throughput. Alternatively (or in conjunction), selected flows can be given prioritised forwarding, meaning that they receive a higher proportion of the forwarding bandwidth.

Attempting to achieve a different minimal queuing delay for different flows is not generally helpful as increasing the delay for one flow does not decrease the delay experienced by others.

In normal FIFO operation, all TCP flows will receive an equal amount of congestion loss/marks (as a proportion of the flow traffic). This results in flows with longer round trip times (RTTs) suffering more since these flows take longer to recover from loss. For example the Mathis law suggests that a flow A with 0.1% loss and 40 ms RTT will achieve an overall throughput of 8.81 Mbps while a flow B with 20 ms RTT will achieve a much higher throughput of 17.61 Mbps (Mathis et al: "The Macroscopic Behavior of the TCP Congestion Avoidance Algorithm", Computer Communication Review, ACM SIGCOMM, vol. 27, no. 3, July 1997).

Since throughput is in equilibrium with the latency and loss of a flow, it can be seen that this equilibrium can be altered by giving one flow more packet loss/marks than the other. For example, to achieve an equal distribution of bandwidth, higher congestion signalling (loss or congestion marking) can be given to the flow with the lower RTT. In the example above, giving flow A 0.0444% loss and flow B 0.1778% will result in them both achieving 13.85 Mbps. A known (and simpler) technique for achieving the same result is to use Fair Queuing (FQ). In this technique the bandwidth is shared evenly and each flow will then achieve its own loss rate according to its RTT.

FIG. 1 shows a packet-forwarding network element 10 having two interfaces 11 and 12, forwarding packets between a server 1 and a client 2. It should be noted that in this example, there is a server/client relationship between the two entities in the sense that the primary sender of data is referred to as the server while the primary receiver of data is referred to as the client, but in other implementations, there need not be such a server/client relationship—the respective entities may be peers, or may both be acting as servers performing different roles, for example. In this example the idea that data is primarily being provided from a server 1 to a data-receiving client 2 is reflected in the idea that there is a "downstream" direction and an "upstream" direction for data flow, but it will be understood that this may in some cases be an arbitrary distinction, particularly in the case of peer-to-peer data exchange, for example.

Network element 10 is shown handling a single downstream flow 3a from server 1 to client 2, and also handling an associated upstream flow 3b (which may be a flow of TCP acknowledgements (ACKs) in respect of packets making up flow 3a, but it will be understood that these need not traverse the same path as each other). The upstream flow has a queue 13b.

Packets received from server 1 or intended to be forwarded to server 1 pass via interface 11, while packets intended to be forwarded on to client 2 or received back from client 2 pass via interface 12. To simplify the explanation, while it will be appreciated that both interfaces could be regarded both as "upstream" and "downstream" interfaces (depending on whether they are being defined to reflect their role in relation to flow 3a or 3b), and there may in some cases be just a single input/output (I/O) interface acting as an ingress and as an egress, the two interfaces shown here will generally be defined with reference to their role in relation to "downstream" flow 3a, so interface 11 will generally be referred to as the "upstream interface", while interface 12 will generally be referred to as the "downstream interface". This convention will generally be used in relation to this and other figures where applicable.

A simple network queue 13a is shown for packets awaiting forwarding to client 2 via downstream interface 12, which has a forwarding scheduler 14a, while a similar (but in this instance, smaller) network queue 13b is shown for packets awaiting forwarding to server 1 via upstream interface 11, which has a forwarding scheduler 14b.

If the network element 10 is a bottleneck (i.e. downstream interface 12 has less capacity than the combined upstream path) then a queue 13a will develop on the downstream interface 12. Dynamic queues may also develop if the server 1 (or another such upstream network element) forwards packets in bursts.

The overall bandwidth usage needs to be constrained, but there is a choice of how to balance the bandwidth between flows—the respective flows do not need to be forced into the same loss rate (as with FIFO) or allocated the same bandwidth (as with FQ). According to preferred embodiments of the invention, it is instead proposed to adjust the loss/marking and hence bandwidth for respective flows dependent on the RTTs for the respective flows (and possibly in dependence on other flow characteristics).

FIG. 2 illustrates a flow priority forwarding technique according to a preferred embodiment implemented by a packet-forwarding network element 20. Network element 20 is shown as having an "upstream" interface 21 and a "downstream" interface 22 (the terms "upstream" and "downstream" being used with respect to the idea that in this example, the primary flow of data is in a direction from a server to a client). In FIG. 2, two concurrent flows 3 and 3' (from respective servers 1 and 1' to respective clients 2 and 2') are shown. For simplicity, only the downstream flows are shown, but it will be understood that there will generally be associated upstream flows in respect of each downstream flow, which may pass via the same network element 20 (but which may traverse the network via a different path). It will also be understood that there may be other flows passing via network element 20 from and to both servers 1 and 1' and clients 2 and 2', and/or flows passing between server 1 and clients 2', or between server 1' and client 2, for example, but only the two downstream flows 3 and 3' are shown in order to avoid the figure becoming unnecessarily complex.

In FIG. 2, packets from the respective flows 3 and 3' are received via interface 21. The flows to which respective packets belong may then be identified from the source and destination addresses (or other such indications) in their packet headers, allowing the packets to be classified on a flow-by-flow basis. Such classification may also be done on the basis of the port numbers of interface 21 via which the packets arrived at the network element 20, or in other ways, allowing the packets to be classified in other ways, or sub-classified where applicable.

The packets of the respective flows (or other subsets) are analysed by a flow analysis module 25 (or "flow analyser") in order to determine their respective flow characteristics such as round-trip delay, which may be stored in a memory 26 for further or later analysis or use.

Flow analysis can be performed by examining the TCP packets as they traverse an observation point. Downstream packets have a sequence number and therefore missing packets (due to loss upstream of the observation point) can be observed along with re-transmitted packets in response to loss anywhere along the path. Furthermore the acknowledgements in the reverse direction can be observed. Delay from the observation point to the downstream host and back can be computed by observing the delay between the downstream packet and the corresponding acknowledgement. Similarly upstream delay from the observer to the server and back can be computed by observing the delay between the acknowledgements and the next packets in the sequence.

The forwarding scheduler 24 can then apply a different priority in respect of the packets in the queues 23, 23' for the respective flows 3, 3' based upon these measured characteristics.

The differentiation or different prioritisation in the manner of "forwarding" processes, whereby packets of different flows (or other such subsets) are processed differently in dependence on their RTTs, may itself be done in different ways. The differentiation in forwarding processes for different flows/subsets could be done such that packets from flows/subsets having a smaller RTT get forwarded with a higher priority (or with a shorter delay) than those from flows/subsets with a larger RTT. Alternatively, it could be done such that packets from flows/subsets having a smaller RTT are allocated a larger proportion of the total bandwidth available for forwarding than those from flows/subsets with a larger RTT, or such that fewer packets of those "smaller RTT" flows/subsets get congestion-marked or dropped, for example.

Advantageously, preferred embodiments may also act to maintain low RTT when the queue length (and hence delay) is under transitory load conditions rather than when it is full or maintaining a standing queue. In this case it may not be necessary to drop/mark packets to reduce the overall demand (since the queue is not full/filling). However, the flows will generally still be experiencing some amount of queuing delay. Allocating more forwarding capacity to specific flows can help them maintain a consistently low delay (and hence low overall RTT). The impact of this queuing is inversely proportional to the overall RTT. For example an additional 5 ms delay is 25% of an overall 20 ms RTT but only 10% of a 50 ms RTT. This can be achieved by preferentially forwarding packets for flows with a low measured RTT. The side effect of this is that flows with higher RTT will be given less forwarding bandwidth during congestion. For a FIFO queue we have already seen that this would already be the case as a linear function. With preferred embodiments, this function can, of course, be adjusted.

One possible combined function would be to have a gradual or windowed transition from the RTT weighted priority forwarding to a FQ method depending on the size of the queue. This would attempt to maintain lower and more consistent latency for lower RTT flows but preserve a fair allocation of bandwidth (with RTT constrained by algorithms such as PIE or CoDel) when a standing queue develops or the queue is full.

FIG. 5 shows such a possible priority function. In this example function, priority when the queue is small is assigned based upon the Round-Trip-Time of the flow. As the queue fills the prioritisation moves toward an even priority per flow. As discussed this is just an example function and other functions could be implemented.

In order to implement such an embodiment, a network element could operate in the following manner:
- Forward each new flow with the same default weighting until an RTT assessment can be made
- assess the RTT of the flow from the TCP packets by analysing retransmissions and acknowledgements or obtaining flow information from other sources
- Adjust the forwarding priority of a flow based upon the flow RTT and current queue length
- Optionally additionally adjust the marking/drop rate or a flow based upon the flow RTT and current queue length A possible forwarding process is shown in FIG. 6, which illustrates the forwarding process that may be performed at a packet-forwarding network element such as network element 20 shown in FIG. 2, acting independently (i.e. without receiving flow information from or sharing flow information with other network elements). When a packet arrives, it is classified into a flow (s61) based on the source and destination indications in its header (and possibly based on indications of its source and destination port). This allows the packet to be classified with previous packets of the same flow if such packets have been received, or to be classified as a packet of a potential new flow if no. A determination is made as to whether flow information already exists (s62). This could be because: (a) the network element is already analysing the flow; (b) because information is available from the analysis of similar historical flows. If information exists about the flow then the packet is prioritised based on the flow information and the queue length (s64) and forwarded according to the priority (s68). If no information exists about the flow then a default priority is assigned to the packet (s66) and the packet is sent with that (default) priority (s68).

FIG. 7 illustrates a possible forwarding process which may be performed at a packet-forwarding network element such as network element 30' shown in FIG. 3 operating as part of a possible implementation as a network system where the flow may have been previously analysed by an upstream network element 30. In this case the first step is to examine the packet and determine if there is an existing priority mark (s70). If there is then the packet is simply forwarded with the requisite priority (s78). If the packet is not marked the flow determination and priority assignment and forwarding proceeds according to the previous process shown in FIG. 6, with steps s71, s72, s74 and s76 of FIG. 7 corresponding essentially to steps s61, s62, s64 and s66 of FIG. 6.

Optionally, rather than learning the RTT and loss characteristics of each new flow, the system could also learn from past flows in order to start the flow with a more appropriate prioritisation than a default prioritisation. This could be done by taking an average performance over a historical time window, for example. Such a window could also be weighted to give higher significance to recent measurements, using an exponentially-weighted moving average (EWMA) or other such weighting algorithm, for example. Preferably, such a time window should be sufficiently short to allow for changing network conditions and routes, but large enough to record stable and statistically relevant results. This historical state could be kept at a number of levels of aggregation. Past flows sharing the same source/destination IP address and port numbers will generally provide the most accurate data. However since many applications will assign dynamic port numbers, just working with IP addresses may be more practical. Since many flows will originate from large clusters of servers (e.g. Content Delivery Networks (CDNs), data centres, etc.), the IP addresses can commonly be aggregated into subnets or service locations. When a flow starts it can be matched to historical flows by inspecting its source and destination IP address (and possibly port numbers and/or other information such as client ID for HTTP flows, for example) and assumed to have that initial RTT.

It is also possible that the flow can be characterised based on additional information that is not transmitted within the flow itself. For example, knowledge of the end-user could be used to identify which network a user was connected to, with a priority assignment being made on that basis. An implementation of this could be done using Deep Packet Inspection (DPI) to identify a user and then fetch network and product information from other data stores. Similarly DPI can be used to identify the service being used and the source location of the flow.

In practice it may appear that there is little to be gained from recording and looking-up historical flow information, since new flows can be assessed dynamically after the first few packet exchanges. However, recording historical flow performance can enable non-real-time embodiments as illustrated in FIG. 4. In such an embodiment, the historical flow information may be analysed by a flow analysis module 450 of a network element 45, having interfaces 451 and 452, then stored in a Flow Information Repository or online store 46 (or in a memory module 460 thereof). The memory module 460 may be located in, with or remote from network element 45. Another forwarding element 40 having upstream interface 41 and downstream interface 42 may then simply retrieve the typical historical performance for flows (rather than needing or attempting to measure the RTT and/or other characteristics of actual flows in real-time), and a forwarding scheduler 44 therein, which may correspond to the forwarding scheduler 24 of network element 20 in FIG. 2, may use this retrieved information in order to prioritise or otherwise control the forwarding of packets from respective flows 3 and 3' (which in this case are shown forming queues 43 and 43') from its downstream interface 42.

Embodiments such as this may enable simple and lower-cost network elements to benefit from being able to forward packets (or other types of data units) from different flows in dependence on RTT measures (and/or possible other flow characteristics) obtained for the respective flows without needing to be capable of performing the full flow analysis and determination of flow characteristics themselves, the historical flow analysis instead being performed by centralised infrastructure (such as DPI—Deep Packet Inspection), for example.

It will be noted that the flow information may be used in order to allow prioritisation or other such control of the forwarding of packets from respective flows by network element 45 itself (which may therefore have a forwarding scheduler (not shown) corresponding to the forwarding scheduler 24 of network element 20 shown in FIG. 2), but for the purposes of the present explanation, network element is shown primarily performing an analysis function.

It will also be noted that FIG. 4 serves to illustrate the concept of historical flow analysis. The flow analysis may be performed in either real-time (with network element 45 sitting in the flow of the traffic as shown) or offline (e.g. with network element 45 processing a mirror of the network traffic). A network element 40 applying the forwarding priority algorithm does not itself need to analyse the flow dynamically but looks upon the typical flow performance historical flows have received based upon information such as source and destination IP addresses. In this case not all flows have to be assessed since a sampling methodology may be adequate to build a view of the typical flow performance.

Systems operating in accordance with certain embodiments can be implemented on a single routing/forwarding device or can be implemented across a distributed network. In the latter case, while it is possible, there may be little benefit in each item of routing/forwarding equipment individually assessing the RTT of the flows whose data items it is forwarding. Instead a limited range of upstream devices could perform the RTT assessment and assign priority marking in a similar manner to DiffServ. Downstream devices would then be able to prioritise based upon these marks rather than having to implement the complexity of assessing RTT per flow. Where the host systems themselves are trusted they may measure the RTT at the sending host and set the priority marks to be used by the network equipment.

FIG. 3 shows such an implementation across a number of network elements where two (an upstream network element 30 and a downstream network element 300) are shown in the diagram. As with FIG. 2, two concurrent flows 3 and 3' (from respective servers 1 and 1' to respective clients 2 and 2') are shown, and for simplicity, only the downstream portions of those flows are shown.

The upstream network element 30 performs the flow classification of packets of flows 3 and 3' (and of any other flows) received from servers 1, 1' via interface 31 in a flow analysis module 35, in order to determine their respective flow characteristics such as round-trip delay. These flow characteristics may be stored in a memory 36. Optionally, network element may itself have a forwarding scheduler 34 which can then implement a chosen priority forwarding algorithm on behalf of interface 32 in order to apply a different priority in respect of the packets in the queues 33 and 33' for the respective flows 3 and 3' based upon these measured characteristics.

Whether or not network element 30 is implementing a priority forwarding algorithm itself, once a flow has been classified, appropriate priority marks may be written into the packets of the flows 3 and 3' in dependence on their respective RTTs (and possibly other flow characteristics) before the packets of the respective flows are forwarded on, via interface 32, towards the downstream network element 300. The downstream network element then receives the packets via its interface 310. Packets of flows 3 and 3' may then be held respectively in queues 330 and 330' before being forwarded, with the forwarding scheduler 340 of network element 300 prioritising the traffic on the basis of the priority marks assigned by the upstream network element 30 (and/or other network elements).

The invention claimed is:

1. A method of processing data items received at a network element in a communications network, respective data items having indications of their source and of an intended destination, the method comprising, in respect of data items received at the network element:
   classifying respective data items of those received into subsets in dependence on their respective source and destination indications;
   determining respective performance characteristics for the subsets, the performance characteristic for a subset being determined in dependence on one or more time measures indicative of a total time taken for data items to travel from the network element to the intended destination for data items of the subset, from the intended destination for data items of the subset to the source for data items of the subset, and from the source for data items of the subset to the network element; and
   forwarding respective data items according to a forwarding process, the forwarding process for data items of each respective subset being dependent on the respective performance characteristic determined for the subset into which the respective data items have been classified.

2. A method according to claim 1 wherein respective received data items have indications of their source and destination port, and wherein the classifying of respective received data items into subsets is performed in dependence additionally on their respective source and destination ports.

3. A method according to claim 1 wherein identifications are made of applications in respect of respective data items received, and wherein the classifying of respective received data items into subsets is performed in dependence additionally on the applications identified in respect thereof.

4. A method according to claim 1 wherein respective received data items have additional flow identifiers, and wherein the classifying of respective received data items into subsets is in dependence additionally on their respective additional flow identifiers.

5. A method according to claim 1 wherein the performance characteristic for a subset is determined in dependence on a current and/or most recent time measure in respect of data items of the subset.

6. A method according to claim 1 wherein the performance characteristic for a subset is determined in dependence on a plurality of time measures made at different times in respect of data items of the subset.

7. A method according to claim 6 wherein the performance characteristic for a subset is determined in dependence on a weighted average of the time measures.

8. A method according to claim 1 wherein the performance characteristic for a subset is determined in dependence on one or more measures of loss and/or throughput rate in respect of data items of the subset.

9. A method according to claim 1 wherein the forwarding of data items of respective subsets comprises forwarding data items with a priority dependent on the performance characteristic determined for the respective subset into which the respective data items have been classified.

10. A method according to claim 1 wherein the forwarding of data items of respective subsets comprises forwarding a proportion of data items of a subset, the proportion being dependent on the performance characteristic determined for the respective sub set.

11. A method according to claim 1 wherein the forwarding of data items of respective subsets comprises forwarding respective volumes of data items of each respective subset within a particular time period such that each volume makes up a proportion of the total volume of data items of all subsets forwarded within that time period, the proportion for each subset being dependent on the performance characteristic determined for the respective sub set.

12. A method according to claim 1 wherein the forwarding of data items of respective subsets comprises assigning marks in respect of a proportion of data items of a subset, the proportion being dependent on the performance characteristic determined for the respective subset.

13. An apparatus for scheduling the processing of data items received at a network element in a communications network, respective data items having indications of their source and of an intended destination, the apparatus comprising:
    one or more processors configured to classify respective data items of those received at the network element into subsets in dependence on their respective source and destination indications, and to determine respective performance characteristics for the subsets, the performance characteristic for a subset being determined in dependence on one or more time measures indicative of a total time taken for data items to travel from the network element to the intended destination for data items of the subset, from the intended destination for data items of the subset to the source for data items of the subset, and from the source for data items of the subset to the network element; and
    a forwarding scheduler configured to schedule respective data items for forwarding from an interface of the network element according to a forwarding process, the forwarding process for data items of each respective subset being dependent on the respective performance characteristic determined for the subset into which the respective data items have been classified.

14. A network element for processing data items, the network element comprising:
    one or more interfaces configured to receive data items, respective data items having indications of their source and of an intended destination;
    scheduling apparatus according to claim 13, configured to schedule the processing of data items received at an interface of the network element; and
    one or more interfaces configured to forward respective data items in accordance with a schedule determined by the scheduling apparatus.

15. The apparatus according to claim 13 wherein respective received data items have indications of their source and destination port, and wherein the classifying of respective received data items into subsets is performed in dependence additionally on their respective source and destination ports.

16. The apparatus according to claim 13 wherein identifications are made of applications in respect of respective data items received, and wherein the classifying of respective received data items into subsets is performed in dependence additionally on the applications identified in respect thereof.

17. The apparatus according to claim 13 wherein respective received data items have additional flow identifiers, and wherein the classifying of respective received data items into subsets is in dependence additionally on their respective additional flow identifiers.

18. The apparatus according to claim 13 wherein the performance characteristic for a subset is determined in dependence on one or more measures of loss and/or throughput rate in respect of data items of the subset.

19. The apparatus according to claim 13 wherein the forwarding of data items of respective subsets comprises forwarding data items with a priority dependent on the performance characteristic determined for the respective subset into which the respective data items have been classified.

20. A non-transitory, computer-readable storage medium storing computer program code to, when loaded into a computer system and executed thereon, cause the computer to perform steps of a method of processing data items received at a network element in a communications network, respective data items having indications of their source and of an intended destination, the steps comprising, in respect of data items received at the network element:
    classifying respective data items of those received into subsets in dependence on their respective source and destination indications;
    determining respective performance characteristics for the subsets, the performance characteristic for a subset being determined in dependence on one or more time measures indicative of a total time taken for data items to travel from the network element to the intended destination for data items of the subset, from the intended destination for data items of the subset to the source for data items of the subset, and from the source for data items of the subset to the network element; and
    forwarding respective data items according to a forwarding process, the forwarding process for data items of each respective subset being dependent on the respective performance characteristic determined for the subset into which the respective data items have been classified.

* * * * *